3,152,194
PROCESS FOR SEPARATING HIGHER HYDRO-
CARBONS FROM GAS MIXTURES CONTAINING
ACETYLENE AND/OR ETHYLENE
Franz Pohl, Leverkusen - Wustenhof, Franz - Joachim
Arimont, Cologne-Klettenberg, Erich Schalius, Cologne,
and Günter Legutke, Brühl, Germany, assignors to
Knapsack - Griesheim Aktiengesellschaft, Knapsack,
near Cologne, Germany, a corporation of Germany
Filed Apr. 20, 1961, Ser. No. 104,390
Claims priority, application Germany Apr. 23, 1960
8 Claims. (Cl. 260—679)

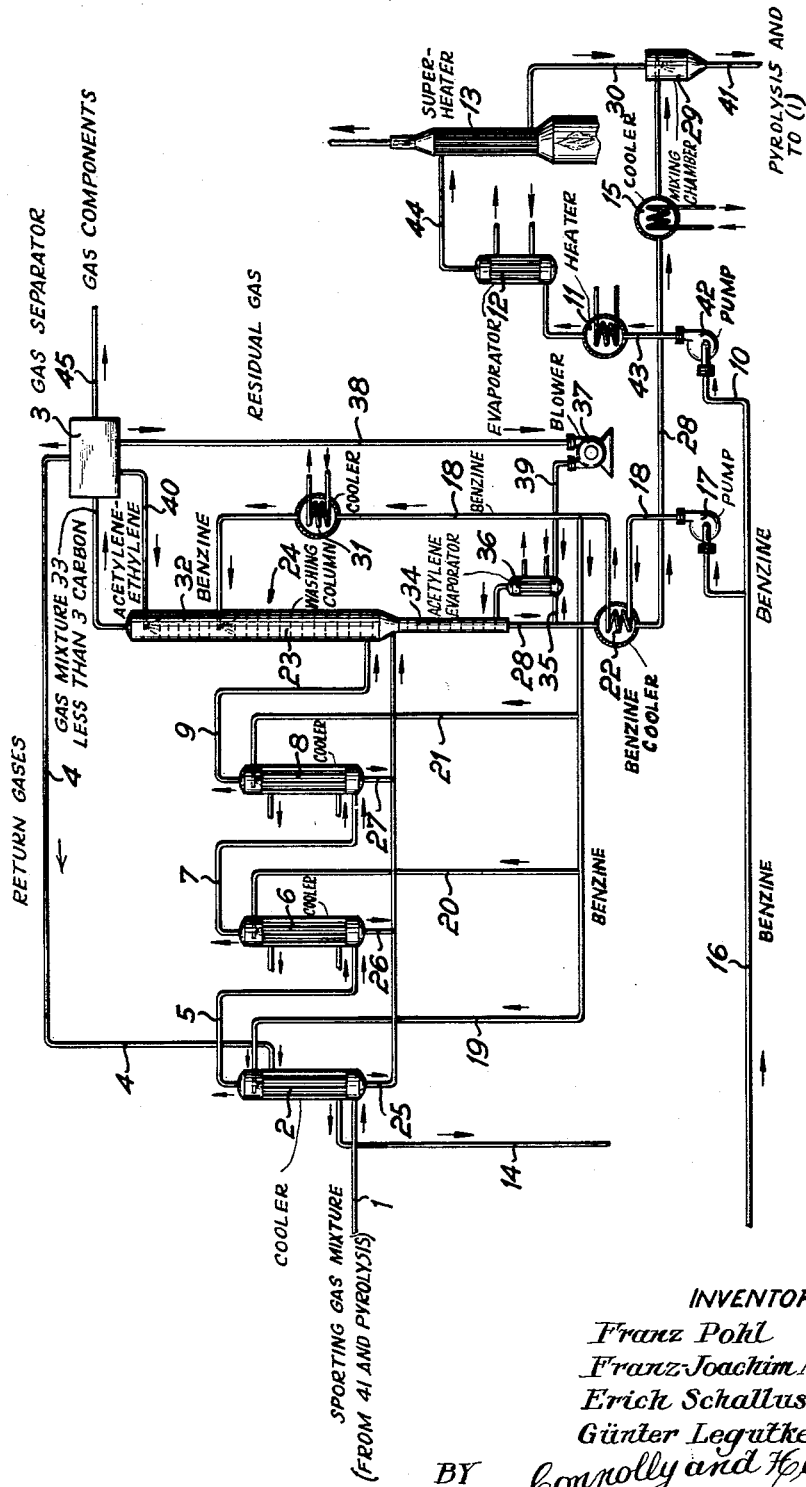

The present invention relates to a process for separating higher hydrocarbons, especially hydrocarbons having at least three carbon atoms, from gases which contain acetylene and/or ethylene and are obtained, for example, in the pyrolysis of liquid hydrocarbons.

It is known to separate higher hydrocarbons, especially paraffins, olefins, benzenes, and higher acetylenes such as diacetylene, methylacetylene, monovinyl-acetylene and the like, from acetylene and/or ethylene-containing gases obtained in the pyrolysis of liquid hydrocarbons by fractional condensation or by absorption with the aid of a suitable solvent, such as benzine in a temperature range from $+30°$ C. to $-50°$ C. As absorbing agent there can be used either the hydrocarbon to be subjected to pyrolysis or a fraction thereof. The constituents of the gas of pyrolysis dissolved in the absorbing agent are isolated or, in the case the absorbing agent is the starting material in the process of pyrolysis, conducted to the pyrolysis.

The known processes, in part or all, involve numerous disadvantages which do not guarantee a safe carrying out of the processes or considerably impair their economy. In the known processes the aforesaid impurities are often separated very incompletely so that the final product obtained is strongly contaminated. This deficiency can only be overcome by the use of large amounts of solvent in a multi-stage purification process wherein solvent vapors cannot be prevented, because of their vapor pressure, from penetrating into the other or remaining parts of the device wherein they provoke disturbances or from which they must be removed with considerable expense. The contaminated solvent obtained at the end of the purification process must be regenerated which requires expenditure pertaining to apparatus and energy involving additional investment.

When the starting hydrocarbon is used as purifying agent it is often necessary to concentrate the impurities dissolved therein, whereby explosive gaseous constituents are also concentrated which, due to the increased partial pressure, have the tendency spontaneously to decompose and thus endanger the safety of the process. After evaporation the starting hydrocarbon can then be directly conducted to the pyrolysis together with the concentrated impurities. During the evaporation step some of the impurities, for example the higher acetylenes, may polymerize whereby parts of the evaporation device are clogged. In order to avoid an interruption of the purification process it is, therefore, necessary to use two evaporators which must be regularly scrubbed in short intervals.

It has now been found that higher hydrocarbons, especially those having at least three carbon atoms such as paraffins, olefins, benzenes, and higher acetylenes, can be separated from the crude gas mixture containing acetylene and/or ethylene obtained in the pyrolysis of liquid hydrocarbons, while avoiding the disadvantages of the known processes, by first washing the crude gas mixture with a partial current of the liquid hydrocarbon intended for pyrolysis at a temperature in the range from about $-60°$ C. to about $-80°$ C. under a pressure of about 10 to 20 atmospheres, evaporating and superheating the main proportion of the liquid hydrocarbon under atmospheric pressure at a temperature of about $400°$ C. to $500°$ C. and subjecting the superheated hydrocarbon to pyrolysis after combination with the washing liquid contaminated with the higher hydrocarbons and preheated to a temperature below the boiling point.

The partial current of the starting hydrocarbon branched off as washing liquid, which amounts to about 30% to 60% of the total quantity of the starting hydrocarbon, is conducted in a preferably one-stage washing process in countercurrent manner to the acetylene and/or ethylene-containing crude gas mixture. Above the inlet of the washing liquid that has been cooled to about $-40°$ C. to $-60°$ C. into the purification stage, a cooling or condensing zone is maintained wherein considerable amounts of about 10% to 30% of the gaseous acetylene, ethylene and other condensable gases are liquefied, which additionally improve the washing effect of the washing liquid used.

The acetylene and ethylene dissolved in the washing liquid are eliminated at a temperature of about $-40°$ C., for example, that is increased as compared with the absorbing temperature in the washing process, by blowing out with part of the preheated residual gas leaving the purification stage and obtained after the separation of the acetylene and/or ethylene. The blowing out of the acetylene and/or ethylene from the contaminated washing liquid can be carried out either in an expelling zone within the purification stage, which expelling zone is below the inlet of the crude gas mixture into the purification stage, or in a separate blowing off device.

In order to separate, already prior to the washing process, part of the components of the crude gas mixture that are the most readily soluble in the washing liquid and that partially undergo polymerization very readily, such as diacetylene, benzene and phenylacetylene, it is of advantage but not necessary to charge the cooling stages connected in series with the actual purification stage and serving to cool the crude gas mixture to a temperature of about $-60°$ C., with a partial current of the washing liquid branched off. The quantity of the partial current branched off from the washing liquid amounts up to about 10%, calculated on the quantity of washing hydrocarbon.

The individual cooling stages can be cooled either by separate cycles of cooling agents or with the aid of the residual gas leaving the purification stage and obtained in known manner after the separation of acetylene at low temperatures. The contaminated washing liquid leaving the cooling stages is combined with the main proportion of washing liquid before the latter enters the expelling zone.

As compared with the known process the process of the invention offers the advantage that all higher hydrocarbons can be completely separated from a gas mixture containing acetylene and/or ethylene and originating from the pyrolysis of liquid hydrocarbons in a preferably one-stage purification process with a small amount of the starting hydrocarbon ot be subjected to pyrolysis, such as benzine, so that the main proportion of the starting hydrocarbon can be evaporated and superheated without danger of polymerization and then combined immediately prior to pyrolysis with the preheated and contaminated washing liquid which is thereby evaporated. The process of the invention can be carried out as a one-stage purification process with small expenditure pertaining to apparatus, since, in contradistinction to the known processes a regeneration of the contaminated solvent is dispensed with. By combining the contaminated washing liquid with the main proportion of the hydrocarbon to be decomposed only immediately prior to pyrolysis a clogging of parts of the apparatus by polymerization products is avoided. Furthermore by the process of the present invention a danger in the separation of the acetylene dissolved in the washing liquid is avoided by the fact that through the washing liquid which has been preheated in a heat exchanger to about −40° C. passes simultaneously a current of inert residual gas leaving the purification stage and obtained after the separation of acetylene, so that the acetylene dissolved in the washing liquid is expelled without danger in dilute state.

The accompanying drawing diagrammatically represents a flowing scheme for carrying out the process of the invention, without limiting it thereto. The flowing scheme is illustrated with the aid of the following example.

EXAMPLE 1000 cubic meters (measured under normal conditions N.T.P.) of a crude gas having composition A (cf. the following table) and obtained in the pyrolysis of benzine is conducted per hour under a pressure of 16 atmospheres and at a temperature of +40° C. through conduit 1 into a heat exchange cooler 2 wherein the crude gas is precooled by heat exchange with return gases from gas separating unit 3, which return gases enter heat exchanger 2 by way of conduit 4. The crude gas travels through conduit 5 into cooler 6 where it is further cooled by means of evaporating ammonia and through conduit 7 into heat exchanger 8 which is cooled with evaporating ethylene. The gas leaves heat exchanger 8 at a temperature of −65° C. While the crude gas, which is conducted to heat exchangers 2, 6 and 8 by way of conduits 1, 5 and 7, passes through said heat exchangers in upward direction it is irrigated each time with 5 kilograms of benzine per hour supplied through conduits 19, 20 and 21. The benzine is sprayed into the upper parts of the heat exchangers by means of nozzles only for diluting highly concentrated separations obtained on cooling the crude gas and composed of higher boiling constituents such as diacetylene. The benzine required for irrigating the crude gas in heat exchangers 2, 6 and 8 is branched off conduit 18 after having been precooled in cooler 22. Conduit 18 is supplied with a partial current of 165 kilograms per hour from the total quantity of 340 kilograms per hour flowing in conduit 16 of the starting hydrocarbon intended for the pyrolysis.

The mixtures leaving heat exchangers 2, 6 and 8 are conducted via conduits 25, 26 and 27 into the discharge 34 of washing column 24 below the inlet of the precooled crude gas.

The crude gas leaving heat exchanger 8 at the head and travelling through conduit 9 into absorption part 23 of washing column 24 at a temperature of −65° C. is washed in countercurrent manner with 150 kilograms per hour of benzine and about 30 kilograms of liquefied acetylene and ethylene. The benzine is introduced into absorption part 23 with the aid of a pump 17 via conduit 18 after having been precooled in heat exchangers 22 and 31, while the liquid acetylene/ethylene mixture comes from the condensation part 32 of washing column 24 and travels to the absorption stage 23. The condensation part 32 of washing column 24 receives about 30 kilograms per hour of liquid ethylene from after-connected gas separation unit 3 by way of conduit 40. A gas mixture having the composition B (cf. the following table) and being free from hydrocarbons having at least three carbon atoms and from benzine vapors leaves the washing column 24 via conduit 33 and is further decomposed in separating unit 3 which is operated by known methods. The individual gas components are withdrawn through conduit 45. The acetylene dissolved in the contaminated washing liquid is expelled in discharge 34 of washing column 24. For this purpose the washing liquid is conducted from 34 via conduits 28 and 35 into evaporator 36 where the acetylene is blown out in dilute state at a temperature of −40° C. while simultaneously residual gas that is free from acetylene is blown in from gas separating unit 3 with the aid of blower 37 via conduits 38 and 39. The washing liquid which has been freed from acetylene is conducted via conduit 28 into mixing chamber 29 where it is evaporated. The residual amount of 175 kilograms per hour of starting benzine which flows in conduit 10 after having branched off the aforesaid partial current and is intended for pyrolysis is conducted with the aid of pump 42 through heater 11 where it is preheated and through conduit 43 into evaporator 12 and evaporated therein. The vapor travelling from evaporator 12 via conduit 44 into superheater 13 is heated to a temperature of 450° C. and passes via conduit 30 into mixing chamber 29. By partial heat exchange the vapor brings about, without condensing, the evaporation of the contaminated washing liquid flowing via conduit 28 into mixing chamber 29. The benzine vapor leaving the mixing chamber is conducted to pyrolysis through conduit 41.

Table

| | A, percent | B, percent |
|---|---|---|
| Hydrogen | 70.0 | 69.0 |
| Methane | 7.0 | 6.9 |
| Acetylene | 15.0 | 14.8 |
| Ethylene | 6.0 | 8.2 |
| Methylacetylene | 0.3 | |
| Diacetylene | 0.3 | |
| Vinyl acetylene | 0.2 | |
| Residual gases R | 1.2 | 1.1 |

A is the composition of the crude gas leaving pyrolysis; B is the composition of the gas mixture leaving the washing column; R is the sum of residual gases.

We claim:

1. A process for separating higher hydrocarbons having at least three carbon atoms from crude gas mixtures containing a member selected from the group consisting of acetylene, ethylene and mixtures thereof, and obtained in the pyrolysis of liquid hydrocarbons having a boiling range of about 35° to about 107° C. which comprises precooling said gas mixture, introducing the precooled gas mixture into a purification stage containing in the upper section a cooling and condensation zone, an absorption zone in the middle section, and a discharge zone in the lower section, said precooled gas mixture being introduced into the purification stage between the absorption zone and the discharge zone, diverting about 30–60% of a main stream of liquid hydrocarbons into a branch current, washing said gas mixture in a purification stage with said branch current of liquid hydrocarbons running countercurrent to the gas mixture and flowing into the purification stage between the condensation zone and the absorption zone at a temperature of about −60° to −80° C. and under a pressure of about 10 to 20 atmospheres, maintaining this temperature in the absorption zone by the reflux of about 10 to about 30% by volume of at least one substance selected from the group consisting of acetylene and ethylene introduced into and condensing in the condensation zone, the reflux combined with the branch current washing liquid producing a complete separation of higher boiling impurities from the crude gas mixture, drawing off at the head of the purification stage the purified gas free of higher hydrocarbons with at least three carbon atoms, expelling dissolved acetylene and ethylene from the branch current washing liquid by blowing the same out with residual gas, discharging the contaminated branch current washing liquid from the discharge zone, superheating the main non-branched portion of the pure liquid hydrocarbons at a temperature of 400 to 500° C. at atmospheric pressure, and combining said non-branched portion with the contaminated branch current washing liquid prior to pyrolysis.

2. The process of claim 1, which comprises washing out the crude gas mixture composed of about 0.5 to about 1.5% by volume of higher hydrocarbons, up to about 20% by volume of acetylene, up to about 30% by volume of ethylene and gaseous constituents, with said branch current.

3. The process of claim 1, wherein the cooling and condensation zone are formed by evaporating ethylene.

4. The process of claim 1, wherein the gas dissolved in the contaminated washing liquid and consisting of at least one substance selected from the group consisting of acetylene and ethylene is expelled at a temperature of about —40° C. by blowing out with residual gas that is free from acetylene and ethylene.

5. The process of claim 4, wherein the gas dissolved in the contaminated washing liquid and consisting of at least one substance selected from the group consisting of acetylene and ethylene is evaporated at a temperature of about —40° C. in an expelling zone below the inlet of the crude gas mixture into the purification stage.

6. The process of claim 1, wherein cooling stages are connected in series with the washing stage for precooling the crude gas mixture at a temperature of about —60° C. which cooling stages are preferably charged with a partial current of the branch current, the contaminated washing liquid flowing off being combined with the washing hydrocarbon before the latter enters the expelling zone.

7. The process of claim 6, wherein the crude gas mixture is precooled with the residual gas leaving the purification stage and obtained after the separation of acetylene and ethylene.

8. The process of claim 1, wherein the crude gas mixture is purified by washing it with hydrocarbons having a boiling range of about 35° C. to about 107° C.

References Cited in the file of this patent
UNITED STATES PATENTS

| | | |
|---|---|---|
| 1,938,991 | Wulff | Dec. 12, 1933 |
| 1,988,032 | Baumann et al. | Jan. 15, 1935 |
| 2,183,148 | Murphree | Dec. 12, 1939 |
| 2,236,978 | Taylor | Apr. 1, 1941 |
| 2,741,332 | Finneran et al. | Apr. 10, 1956 |
| 2,823,243 | Robinson | Feb. 11, 1958 |
| 3,060,247 | Wolfram et al. | Oct. 23, 1962 |